Jan. 17, 1928.

B. F. ELBERT 1,656,181

COOKING APPARATUS

Filed March 22, 1927　　2 Sheets-Sheet 1

Inventor.
Benjamin F. Elbert.
by Orwig & Hague Attorneys.

Jan. 17, 1928.

B. F. ELBERT 1,656,181

COOKING APPARATUS

Filed March 22, 1927    2 Sheets-Sheet 2

Inventor
Benjamin F. Elbert.
by Orwig & Hague Attorneys.

Patented Jan. 17, 1928.

1,656,181

UNITED STATES PATENT OFFICE.

BENJAMIN F. ELBERT, OF DES MOINES, IOWA, ASSIGNOR TO BONNIE L. ELBERT, OF DES MOINES, IOWA.

COOKING APPARATUS.

Application filed March 22, 1927. Serial No. 177,342.

The object of my invention is to provide a cooking apparatus of simple, durable and inexpensive construction, especially designed for use in connection with fuel such as charcoal, and whereby a cooking operation such as broiling and roasting may be effected very quickly and thoroughly, and at the same time in such a manner as to retain in the material, such as meat, being cooked a maximum of the juices.

More specifically it is my object to provide a cooking apparatus especially designed for use in restaurants and the like, and whereby material, such as steaks and chops, may be cooked rapidly and efficiently during the so-called rush periods, and then the apparatus may be adjusted quickly and easily to conserve the fuel while at the same time maintaining slow combustion, so that when it is desired to again use the apparatus, it may readily and easily be adjusted to position in which there is a maximum draft and the fuel will be very quickly brought to its maximum temperature.

A further object is to provide an apparatus in which the juices and fats which drip from the material being cooked are not consumed and are retained separated from the ashes and from the fuel, so that their food and commercial value is not impaired.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
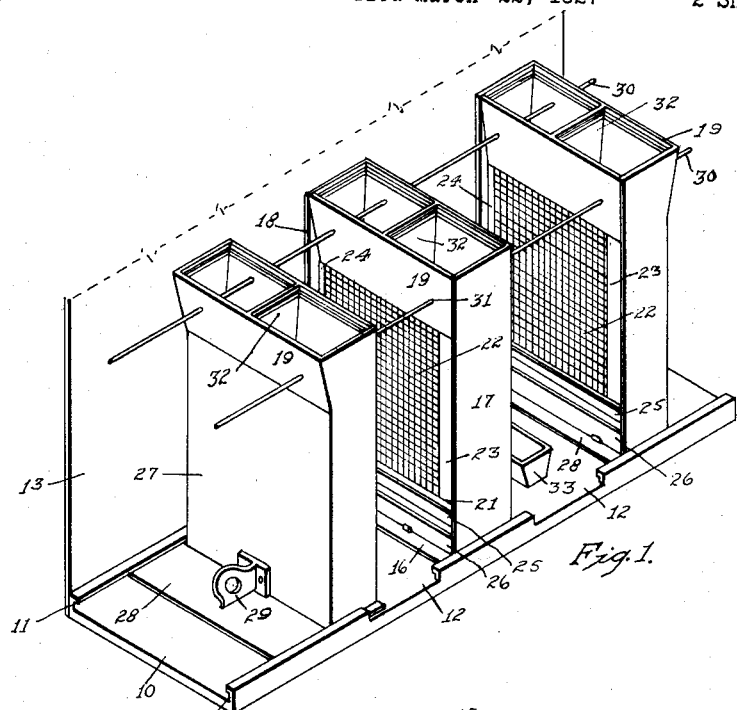
Figure 1 shows a perspective view of an apparatus embodying my invention with the fuel and combustion magazines in position for use, the hood being removed.

Referring to the accompanying drawings, I have used the reference numeral 10 to indicate the base of the apparatus. This base is formed at its front and rear with grooves 11 and it is open at its ends. At the front I preferably provide one or more clean-out notches 12. Secured to the back of the base 10 is an upright sheet metal heat deflector 13, and at the top of the heat deflector is a hood 14 with a pipe opening 15 therein.

Figure 4:
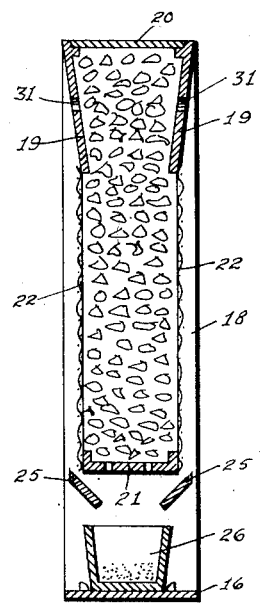
Figure 4 shows a similar view of the central magazine and combustion chamber.

As shown in the accompanying drawings, there are three combined fuel magazines and combustion chambers. I shall first describe the central one, illustrated in Figure 4. It comprises a flat base member 16 with two parallel upright front and back members 17 and 18. At the top, between the front and back members, there is a hopper member 19 open at its top. The sides of this hopper member extend downwardly and inwardly, as shown in Figure 4. At the top of the hopper member there are detachable plates 20. Extended from front to rear between the parts 17 and 18 there is a bottom member for the fuel magazine, indicated by the numeral 21, and formed with perforations to permit draft to pass upwardly and ashes to pass downwardly. The lower edges of the sides 19 of the hopper and the bottom member 21 are of less dimensions from side to side than the back member 18 and the spaces between the hopper member 19, and the bottom 21 on both sides is covered by grates 22. At the front this grate portion is preferably spaced apart from the front member 17 and a solid plate 23 is provided at this point, as shown in Figure 1. The plate is also spaced apart a slight distance from the back member 18 by the plate 24, as shown in Figure 1. Beneath the member 21 on each side is an ash deflector 25 extending from the front 18 to the rear 17 and inclined downwardly and inwardly, as shown in Figure 4, so that ashes dropping through the grates 22 will be deflected thereby into the ash receptacle 26 resting on the bottom 16. Preferably the metal employed in the construction of this magazine and combustion chamber is cast iron.

The two end magazines and combustion chambers differ from the central one in that the outer side wall of each is formed of solid material as indicated at 27, and the grate 22 provided only on the inner face. In addition to this the base member 28 of each of the outer magazines is made relatively long and provided with a handle 29 by which it may be readily grasped to be moved within the grooves 11.

For the purpose of supporting articles to be cooked between the combustion chambers, I preferably provide two straight rods 30, which are extended through openings 31 in the hoppers. Each hopper is preferably provided with a central transverse partition 32 for the purpose of strengthening and supporting the hopper.

When the combustion chambers are spaced apart, as shown in Figure 1, a drip pan 33 may be inserted between them resting upon the base 10.

Figure 2:
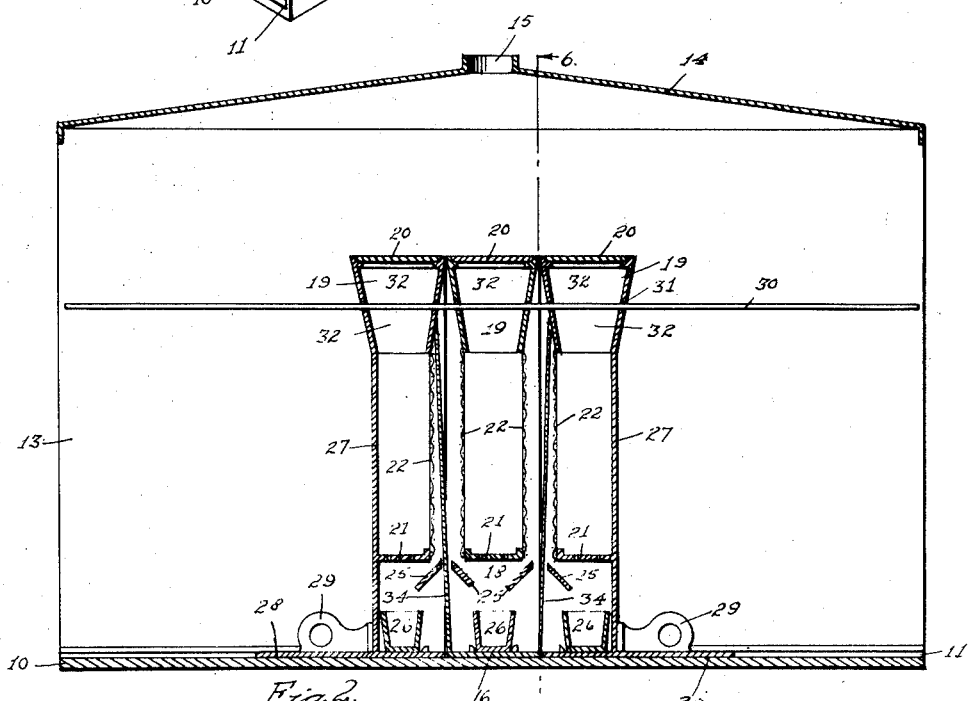
Figure 2 shows a vertical, longitudinal, central, sectional view of an apparatus embodying my invention with the magazines and combustion chambers moved to position into engagement with each other for conserving the fuel while maintaining a minimum combustion of the fuel.
Figure 3:
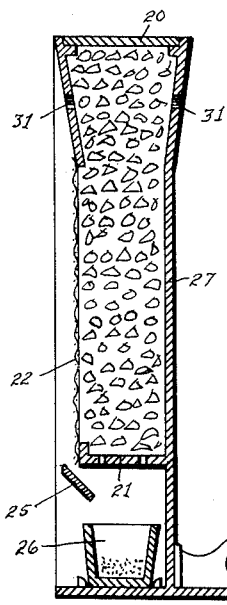
Figure 3 shows a vertical, central, transverse, sectional view of one of the end magazines and combustion chambers filled with fuel.
Figure 5:
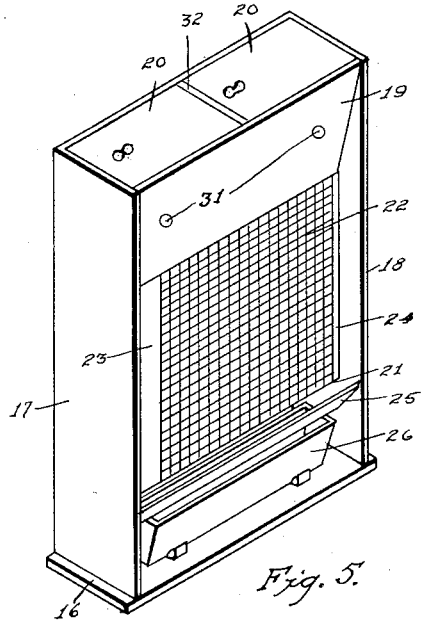
Figure 5 shows a perspective view of the central magazine and combustion chamber.
Figure 6:
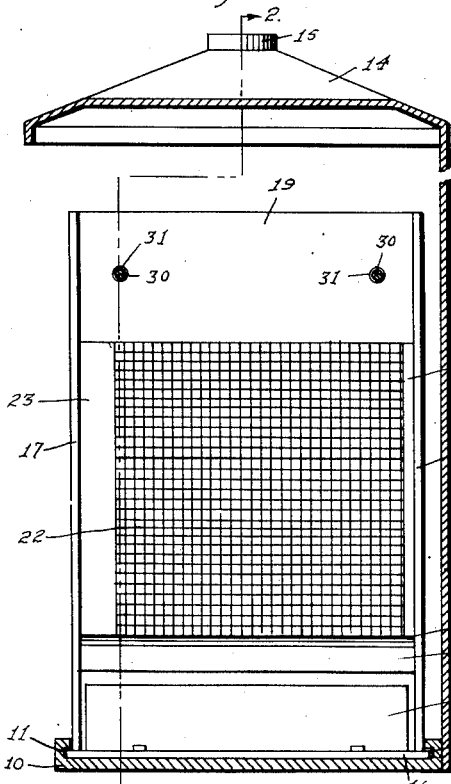
Figure 6 shows a vertical, transverse, sectional view on the line 6—6 of Figure 2.

When the fuel in the two adjacent grate surfaces is burning rapidly and the fuel magazines and combustion chambers are moved close to each other, then there is danger of the grate surfaces becoming burned out. To obviate this difficulty, I have provided two plates 34, which may be made of asbestos material, and which are placed between the two adjacent grate surfaces, as shown in Figure 2, before they are moved together, and when it is desired to again use the apparatus, these plates are first removed.

In practical operation, and assuming that the magazines are filled with fuel such as charcoal, and the covers 20 removed, then the operator grasps the handles 29 and separates the outer magazines a slight distance from the central one. He then ignites the fuel that is exposed through the adjacent grate surfaces, and this may be done by simply burning newspapers or the like in the spaces between the ash receptacles 26, the flames from which will pass upwardly between the adjacent surfaces of the charcoal and quickly ignite them, due to the fact that the two adjacent surfaces of the charcoal will coact with each other and with the flame from the paper in igniting the charcoal. When the fuel has become ignited, and it is desired to broil an article such for instance as a steak, then one of the outer magazines is moved to a position spaced apart from the central one, substantially as shown in Figure 1. Then the steak is placed in an ordinary wire toaster or the like, and this is suspended from the rods 30. The heat generated by the two adjacent surfaces of burning charcoal becomes very intense and because of the fact that it is applied to all parts of the exterior of the steak being broiled, the outer surface of the steak will quickly become seared to such an extent at least as to retain a major portion of the juices. The entire steak is exposed to the observation of the operator from the front, and the amount of heat being applied to the steak at any time may be readily, quickly and easily controlled and regulated by simply moving the outer compartment farther away or closer to the central one, and furthermore, if the steak should be cooked more rapidly on one side than the other, the steak itself and its toaster may be moved on the supporting rods 30. The fats and juices cooked from the steak will drop into the drip pan 33 and may be saved for any desired purpose. Obviously two independent cooking operations may be carried on simultaneously in the two compartments on opposite sides of the central magazine.

During the process of cooking, the air will pass upwardly through the bottom members 21 and through the fuel, but will not pass upwardly through the hoppers at the top of the magazines, because the tops are closed by the covers 20. Therefore, all of the heat generated by the burning fuel will be forced through the grates 22 toward the article being cooked between them. Furthermore, by this arrangement the fuel will automatically feed downwardly as it is consumed and the ashes will drop into the ash chambers 26.

My improved cooking apparatus is well adapted for use in cooking in vessels supported on top of the magazines. When this is being done, a relatively small amount of heat may be applied to the vessels by closing the covers 20. If a great amount of heat is desired for the vessels on top, then the covers are removed and the draft permitted to pass up through the hoppers, thereby increasing the heat as applied to the vessels.

When making toast or the like with my improved apparatus, it is possible for the operator to make what is known as dry toast or the outer surface only of the toast may be browned leaving the interior soft. When it is desired to quickly toast the exterior without toasting the interior of a piece of bread, the grates are placed relatively close together, and on account of the intense heat the operation is quickly performed. When however, it is desired to make what is known as dry toast, the operator need only move the outer compartment a considerable distance away from the central one, and then suspend the toast between them, whereupon the toasting will be done slowly and the toast thoroughly dried before being browned.

Obviously, my improved apparatus is well adapted for roasting operations, the compartments being spaced apart the proper distance for effecting the roasting.

My improved apparatus is especially advantageous for use in restaurants and the like, because after one or more broiling or roasting operations have been performed the operator simply moves the two outer compartments close to the central one, as shown in Figure 2. When in this position, the edges of the front and back members 17 and 18 are relatively close together, although they are not exactly air tight and they admit a sufficient amount of air between them to permit a relatively slight degree of combustion of the fuel, just sufficient to maintain the fire without consuming any appreciable amount of fuel; and in addition to this, the apparatus may stand for hours and then when it is desired to again use the apparatus, the operator first separates the compartments slightly, an inch or so, whereupon with the great draft thus provided the glowing coals are quickly heated to their maximum degree and the device is quickly placed in condition for further broiling or roasting operations.

By the use of the two adjacent burning magazines of fuel, such as charcoal, a very high degree of heat may be generated and constantly maintained, because the two quantities of fuel co-operate with each other.

The three compartments are rigidly and firmly held in upright parallel positions at all times, and yet are free to slide longitudinally of the base to regulate the spaces between them. There are comparatively few ashes from fuel such as charcoal, but these are all collected in ash trays, which may be readily and easily removed and the contents discharged.

I claim as my invention:

1. In a cooking apparatus of the class described, the combination of two combined fuel magazines and combustion chambers, each designed to contain fuel such as charcoal, each being enclosed at its outer, front and rear sides and being formed with a grate at its inner side, and means for slidingly supporting one of said fuel magazines for movement toward and from the other, the said front and rear members being projected laterally beyond the grate members so that when the two fuel magazines are moved together these front and rear members will engage to thereby limit the admission of air and retard combustion.

2. An apparatus of the class described, comprising a base having grooves formed at its front and rear and having ash removing notches formed at its front, three combined fuel magazines and combustion chambers each formed of a flat bottom member slidingly mounted on top of the base with its front and rear ends projected into said groove, the central magazine being formed with front and rear upright members, and also being formed with grate surfaces at its sides, these grate surfaces being spaced inwardly from the adjacent edges of the front and rear members, and the top of the grates being spaced apart a considerable distance from the top of the front and rear upright members, a hopper member extended from the top of the grates upwardly to the top of the front and rear members, a cover for closing the top of the hopper member, the upper ends of the hopper being adapted to receive and support cooking vessels, a perforated grate member at the bottom of said grates spaced apart a considerable distance above the bottom member of the fuel magazine, the two end fuel magazines and combustion chambers being similar to the central one but being formed with solid outer side walls, and rods slidingly extended through the said hopper members for supporting articles to be cooked between the grate members, substantially as and for the purposes stated.

3. In a cooking apparatus of the class described, the combination of two combined fuel magazines and combustion chambers arranged in upright positions adjacent to each other, one being movable toward and from the other, the adjacent sides of the said magazines being perforated to form grate surfaces, the upright ends of one of the magazines being extended laterally beyond the grate surface thereof far enough to engage the upright ends of the other magazine when in one position of its movement, to thereby limit the admission of air and retard combustion.

4. In a cooking apparatus of the class described, the combination of two combined fuel magazines and combustion chambers arranged in upright positions adjacent to each other, one being movable toward and from the other, the adjacent sides of the said magazines being perforated to form grate surfaces, the upright ends of one of the magazines being extended laterally beyond the grate surface thereof far enough to engage the upright ends of the other magazine when in one position of its movement, to thereby limit the admission of air and retard combustion. the upper end portion of one of the adjacent side walls of the magazine above the grate portion being projected laterally toward the other magazine far enough when in one position of its movement to engage the surface of the other fuel magazine to retard combustion.

5. In a cooking apparatus of the class described, the combination of two combined fuel magazines and combustion chambers arranged in upright positions adjacent to each other, one being movable toward and from the other, the adjacent sides of the said magazines being perforated to form grate surfaces, the upright ends of one of the magazines being extended laterally beyond the grate surface thereof far enough to engage the upright ends of the other magazine when in one position of its movement, to thereby limit the admission of air and retard combustion, the upper end portion of one of the adjacent side walls of the magazine above the grate portion being projected laterally toward the other magazine far enough when in one position of its movement to engage the surface of the other fuel magazine to retard combustion, one of said magazines being formed with a bottom member projected laterally beyond the grate surface in a direction toward the other magazine far enough when in one position of its movement to engage the adjacent portion of the other fuel magazine to prevent the admission of air between the magazines at the bottom and retard combustion.

BENJAMIN F. ELBERT.